(12) United States Patent
Scharenbroch et al.

(10) Patent No.: US 7,334,924 B2
(45) Date of Patent: Feb. 26, 2008

(54) ILLUMINATION APPARATUS FOR AN OPTICAL OCCUPANT MONITORING SYSTEM IN A VEHICLE

(75) Inventors: Gregory K. Scharenbroch, Kokomo, IN (US); Joseph E. Harter, Jr., Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 87 days.

(21) Appl. No.: 11/150,688

(22) Filed: Jun. 9, 2005

(65) Prior Publication Data
US 2006/0291223 A1 Dec. 28, 2006

(51) Int. Cl.
*B60Q 1/26* (2006.01)
(52) U.S. Cl. ............... 362/494; 362/276; 362/234; 340/825.97
(58) Field of Classification Search ............ 362/484, 362/488, 490, 492, 493, 494, 276, 802, 503; 382/104
See application file for complete search history.

(56) References Cited

U.S. PATENT DOCUMENTS 6,393,133 B1 * 5/2002 Breed et al. ............... 382/100
6,441,363 B1  8/2002 Cook, Jr. et al.
2001/0022550 A1  9/2001 Steffel
2006/0170770 A1 * 8/2006 MacCarthy ................. 348/148

FOREIGN PATENT DOCUMENTS

EP    1298013    4/2003
FR    2815135    4/2002

OTHER PUBLICATIONS

EP Search Report Dated Sep. 20, 2006.

* cited by examiner

*Primary Examiner*—Renee Luebke
*Assistant Examiner*—Vanessa Girardi
(74) *Attorney, Agent, or Firm*—Jimmy L. Funke

(57) ABSTRACT

An optical occupant monitoring arrangement for a vehicle includes a mounting device attached to a fixed structure of the vehicle. A frame is pivotably attached to the mounting device. A rearview mirror is retained within the frame. An optical energy source is fixedly attached to the mounting device and emits optical energy through the mirror into a passenger compartment of the vehicle. An optical energy receiver receives the optical energy emitted by the optical energy source after the optical energy has been reflected within the passenger compartment of the vehicle.

23 Claims, 5 Drawing Sheets

ILLUMINATION APPARATUS FOR AN OPTICAL OCCUPANT MONITORING SYSTEM IN A VEHICLE

TECHNICAL BACKGROUND

This invention relates generally to automotive optical sensing systems, and, more particularly, to a novel illumination device for an automotive optical sensing system.

BACKGROUND OF THE INVENTION

Automotive optical sensing systems are used to monitor the occupants within a passenger compartment of a vehicle. Such optical sensing systems may be used for driver gaze and drowsiness monitoring, driver identification, occupant classification, occupant position detection, and vehicle security. Further, such optical sensing systems may be used in other types of vision-based safety, convenience, and driver aid systems that are being introduced into vehicles.

The optical sensing system must function in a wide variety of ambient lighting conditions, including at night when the passenger compartment is relatively dark. Thus, the performance of the optical sensing system may depend upon, or at least benefit from, artificial or active illumination from a light emitter. What is meant herein by "active illumination" is that the optical sensing system provides its own source of light. As control over the illumination environment is extremely critical, the use of active illumination may be a necessary requirement.

Illumination by visible light would be distracting to the driver. Thus, it is desirable, for safety reasons as well as for aesthetics, for the light emitted and scattered in the optical system to not be visible to humans. In order to be substantially invisible, the light emitter needs to operate in an infrared portion of the electromagnetic spectrum where the wavelength is greater than approximately 750 nm. The wavelength of the light also needs to be less than approximately 1100 nm in order to be detected by image sensors having a reasonable cost, e.g., silicon-based image sensors. Thus, the useful range of wavelengths for actively-illuminated imager systems is approximately between 750 nm and 1100 nm.

The typical infrared occupant monitoring sensor has two main elements: an emitter and a receiver. The emitter is a light source and optical system that radiates infrared or near-infrared light and illuminates the vehicle occupants. The receiver consists of an optical system and a detector. The optical system collects light scattered by the vehicle occupants and focuses the light signal on the detector. The detector may include a camera.

One of the challenges involved with using artificial illumination is the integration and alignment of the physical components. Illumination packages must have visibility to the subject of interest and, therefore, must be integrated into existing subsystems or added onto/into unused areas. Existing systems attempt to integrate illumination packages into areas of the vehicle that yield optimum performance. In addition to the integration requirement, optical and mechanical alignment is critical to the performance of a system that utilizes artificial illumination. An ideal integration location for artificial illumination is the rear view mirror. Packages that "hang" off the bottom of the mirror increase the bulkiness of the mirror and pose a safety hazard by partially obstructing the driver's view of the forward scene.

What is needed in the art is an illumination device for an automotive optical sensing system that maintains visibility with the subject of interest, maintains correct optical alignment, does not occupy additional space within the passenger compartment, and that does not obstruct the view of the driver.

SUMMARY OF THE INVENTION

The present invention provides an automotive passenger monitoring system including an illumination device that is fixed in position within a rearview mirror housing. The illumination device is fixed to the windshield such that the orientation of the illumination device does not change as the rearview mirror is tilted and/or swiveled by an occupant of the vehicle.

According to one embodiment of the invention, an optical occupant monitoring arrangement for a vehicle includes a mounting device attached to a fixed structure of the vehicle. A frame is pivotably attached to the mounting device. A rearview mirror is retained within the frame. An optical energy source is fixedly attached to the mounting device and emits optical energy through the mirror into a passenger compartment of the vehicle. An optical energy receiver receives the optical energy emitted by the optical energy source after the optical energy has been reflected within the passenger compartment of the vehicle.

According to another embodiment of the present invention, an illumination apparatus for an optical occupant monitoring system in a vehicle includes a mounting device attached to a fixed structure of the vehicle. A shell is pivotably attached to the mounting device and has an internal cavity with an opening defined by a perimeter of the shell. A rearview mirror is retained by the perimeter. An optical energy source is fixedly attached to the mounting device and is disposed within the cavity of the shell.

An advantage of the present invention is that the illumination device does not occupy additional space within the passenger compartment of the vehicle.

Another advantage is that the illumination device does not obstruct the view of the driver.

Yet another advantage is that the illumination device may be used in conjunction with conventional rearview mirror mounting features and structures. Thus, the illumination device requires minimal additional component packaging costs.

A further advantage is that the illumination device may provide uniform illumination of both the driver and front passenger areas.

BRIEF DESCRIPTION OF THE DRAWINGS

The present invention will now be described, by way of example, with reference to the accompanying drawings, in which.

Figure 1:
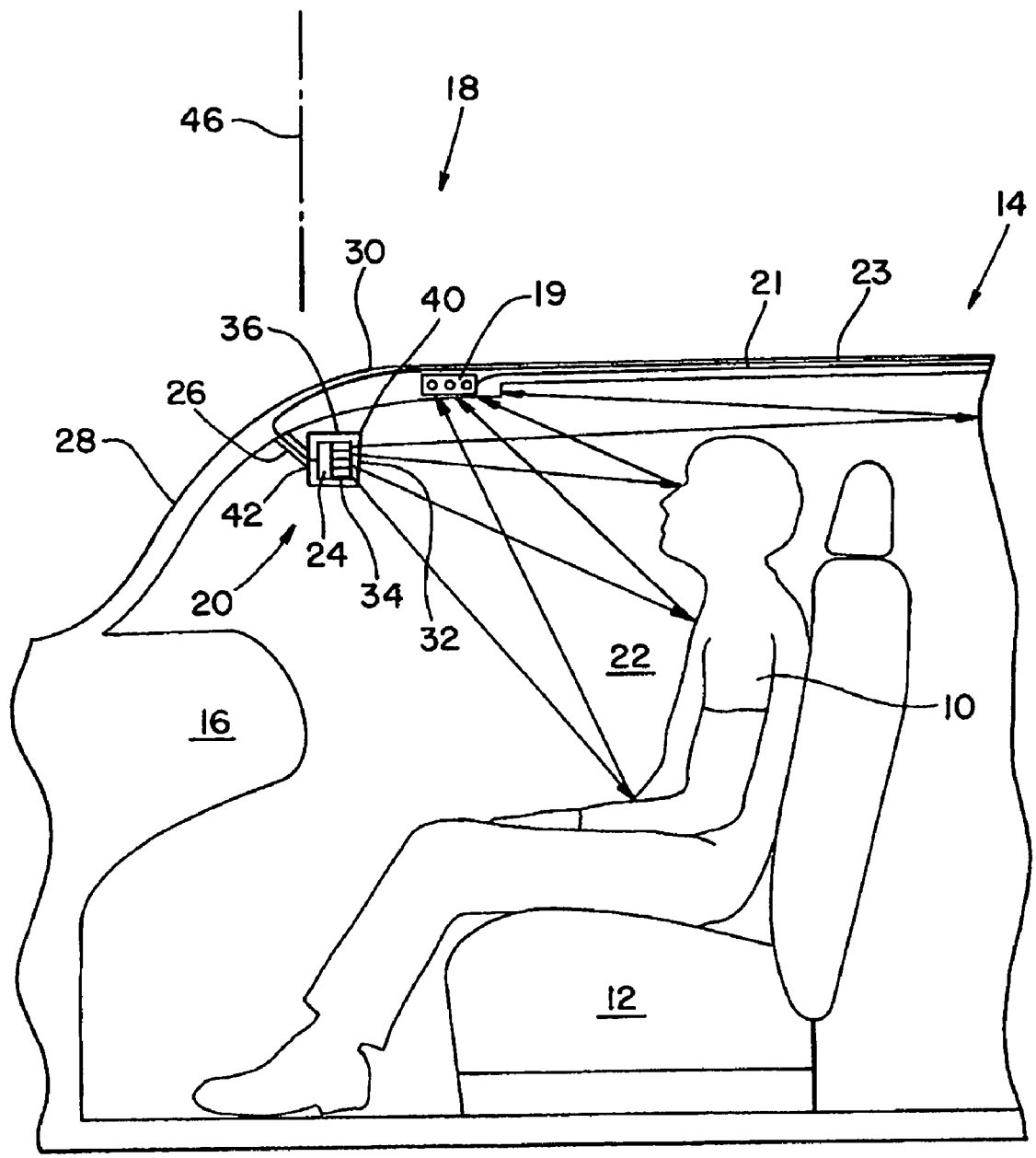
FIG. 1 is a cut-away, fragmentary, side view of a vehicle, with an occupant seated therein, and with the occupant being monitored by the occupant monitoring arrangement of the present invention.

Corresponding reference characters indicate corresponding parts throughout the several views. Although the drawings represent an embodiment of the present invention, the drawings are not necessarily to scale and certain features may be exaggerated in order to better illustrate and explain the present invention. The exemplifications set out herein illustrate an embodiment of the invention and such exemplifications are not to be construed as limiting the scope of the invention in any manner.

DESCRIPTION OF INVENTION

Referring now to the drawings, and particularly to FIG. 1, there is shown a person 10 seated on a driver's seat 12 of a vehicle 14. As shown, person 10 is properly seated on seat 12, with his hips and back placed against the back of the seat, and with the seat set at a safe distance spaced from dashboard 16 of vehicle 14.

An occupant monitoring arrangement 18 is provided in vehicle 14 for performing occupant monitoring functions such as needed in systems that monitor the direction of a driver's gaze, and/or systems that monitor the frequency of a driver's blinking in order to detect when the driver is falling asleep. Occupant monitoring arrangement 18 may also be provided in vehicle 14 for performing other occupant monitoring functions such as driver identification, occupant classification, vehicle security, and occupant position detection.

Arrangement 18 includes an illumination apparatus 20 for illuminating a passenger compartment 22 of vehicle 14. Illumination apparatus 18 may emit optical energy in the form of infrared (IR) or near infrared (NIR) radiation. Active near infrared illuminations have the advantages of being non-intrusive to the occupants and, at the same time, providing enough sensitivity for typical silicon-based receivers.

Arrangement 18 also includes an optical energy receiver in the form of a light detector module 19, which may be a silicon-based receiver. Detector module 19 may receive optical energy emitted by apparatus 20, e.g., IR or NIR radiation or light, after the energy has been scattered or otherwise reflected by objects such as person 10 in passenger compartment 22. Detector module 19 and illumination apparatus 20 may be in communication with a common controller (not shown) via respective communication lines 21, 23.

Apparatus 20 includes an optical energy source 24 fixedly attached to a mounting device 26. Mounting device 26 may be attached to a fixed structure of vehicle 14 such as a windshield 28 and/or vehicle body 30. Optical energy source 24 may be disposed behind a planar rearview mirror 32. Rearview mirror 32 may be transparent to infrared energy emitted by apparatus 20 into passenger compartment 22. Mirror 32 may be supported by a frame 36 that is pivotably coupled to mounting device 26. Frame 36 may be in the form of a shell having an internal cavity 34 in which optical energy source may be disposed. Cavity 34 has an opening 38 (FIG. 2) defined by a perimeter 40 of shell 36. Rearview mirror 32 may be retained by perimeter 40. Shell 36 may be pivotably attached to mounting device 26 at a coupling 42 such that shell 36 and mirror 32 may pivot about either or both of a horizontal axis 44 and a vertical axis 46.

Figure 3:
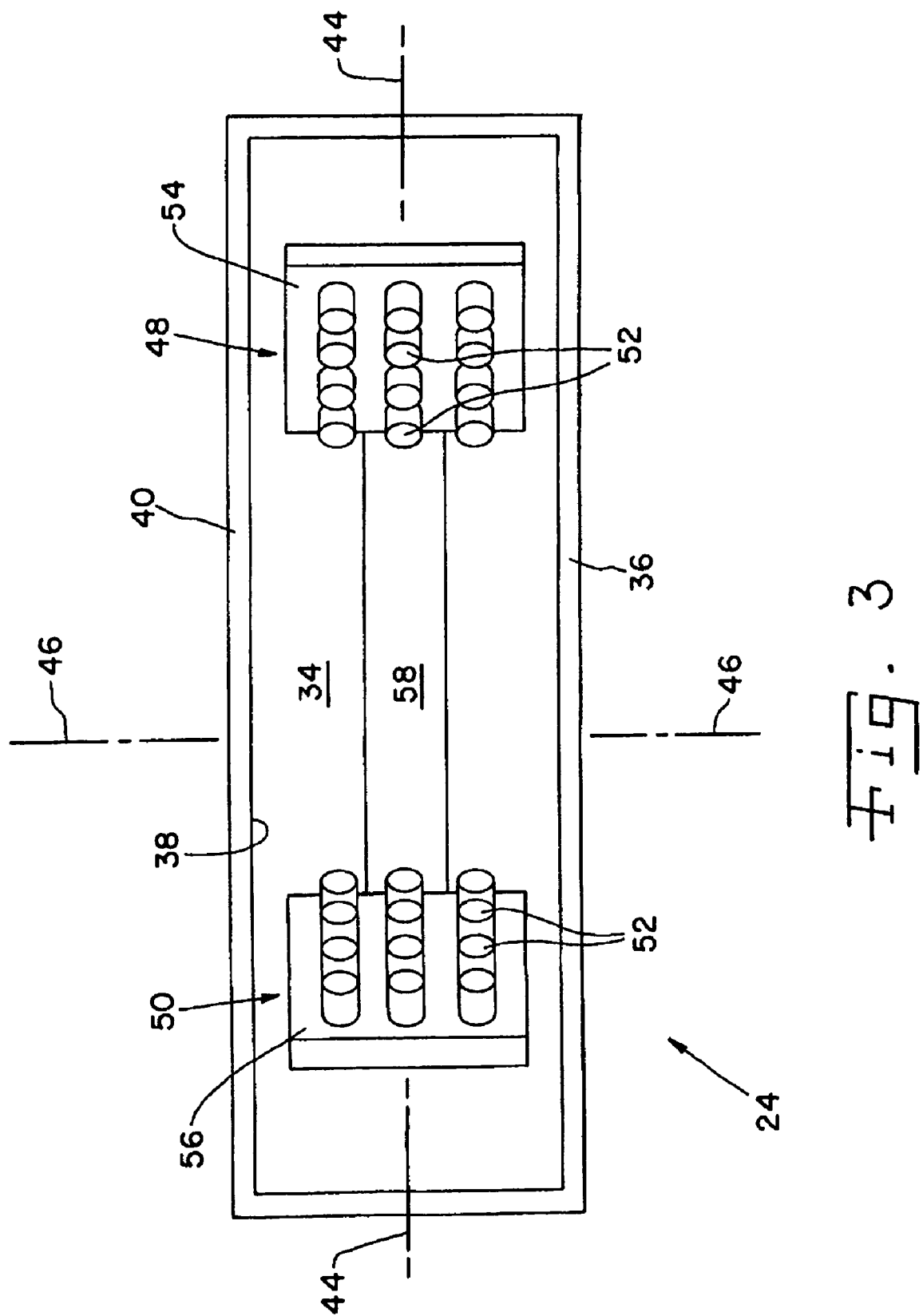
FIG. 3 is a schematic front view of the illumination apparatus of the occupant monitoring arrangement of FIG. 2 along line 3-3.

Optical energy source 24 may be in the form of a pre-aligned infrared light emitting diode board including a pair of two-dimensional arrays 48, 50 of optical energy elements 52, as best shown in FIG. 3. In the embodiment shown in the drawings, arrays 48, 50 both include four columns and three rows of elements 52. However, the arrays may include other numbers of elements 52 in different configurations, which may or may not be positioned in rows and columns. Optical energy elements 52 may be in the form of infrared light-emitting diodes (LEDs). Alternatively, optical energy elements 52 may be in the form of laser diodes, lasers of some other type, incandescent light sources, or thermal light sources, for example.

Figure 2:
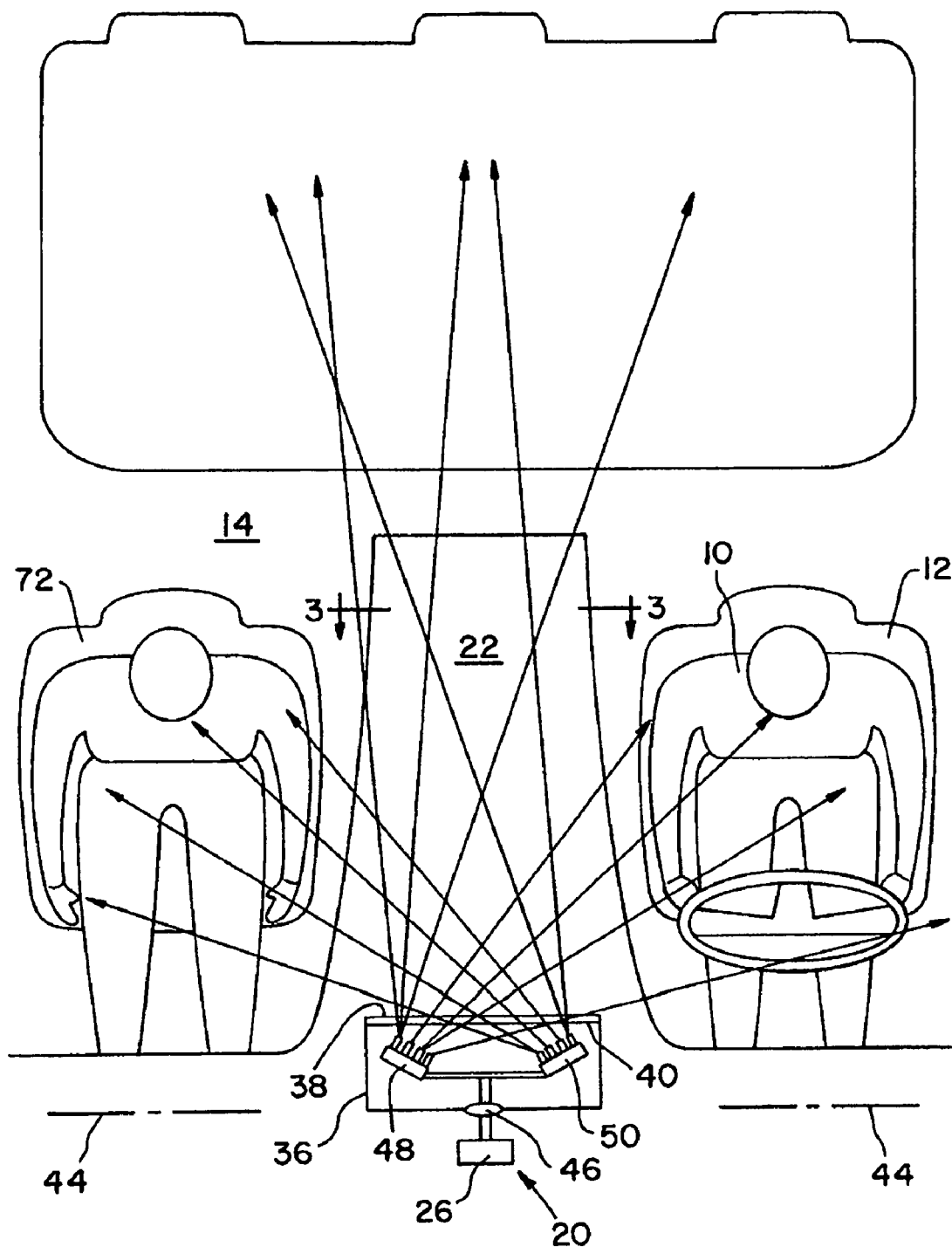
FIG. 2 is an overhead, fragmentary view of the vehicle of FIG. 1, with occupants seated in the driver's seat and the front passenger seat, and with the occupants being monitored by the occupant monitoring arrangement of the present invention.
Figure 4:
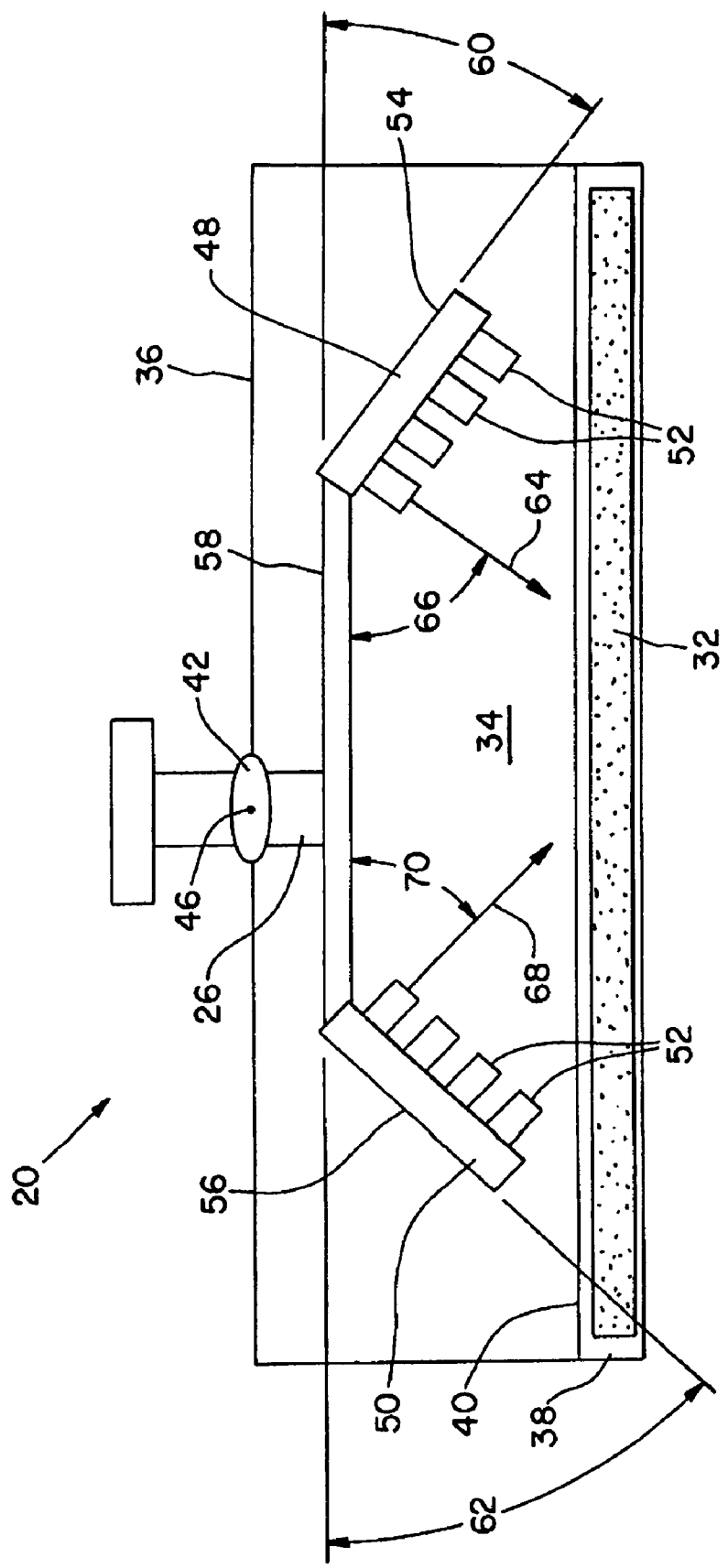
FIG. 4 is a schematic overhead view of the illumination apparatus of the occupant monitoring arrangement of FIG. 1 with the shell and mirror in an unrotated position.

Arrays 48, 50 may include respective substrates 54, 56 for supporting the optical elements 52 of the arrays. The optical elements 52 may be directed at right angles to their respective substrates 54, 56. However, depending on the desired area of the illumination target, optical elements 52 may be directed at other angles relative to substrates 54, 56. A base 58 interconnects array 48 of optical elements 52, array 50 of optical elements 52, and mounting device 26, as best shown in the overhead view of FIG. 4. Substrates 54, 56 may be attached to base 58 at respective acute angles 60, 62, wherein angle 60 is smaller than angle 62. Elements 52 of array 48 have a direction 64 that forms an acute angle 66 with base 58, and elements 52 of array 50 have a direction 68 that forms an acute angle 70 with base 58, wherein angle 66 is greater than angle 70. Given that optical elements 52 are directed at right angles relative to their respective substrates 48, 50, angle 66 is equal to the difference between 90 degrees and angle 60. Similarly, angle 70 is equal to the difference between 90 degrees and angle 62. As best shown in FIG. 2, angles 66, 70 may be such that the elements 52 in array 48 are directed toward driver's seat 12, and the elements 52 in array 50 are directed toward a front passenger's seat 72. Each optical element 52 may be oriented at a unique angle, similar to angles 66, 70, which provides improved uniformity or an increase/decrease of field of view coverage of a desired subject of interest.

Figure 5:
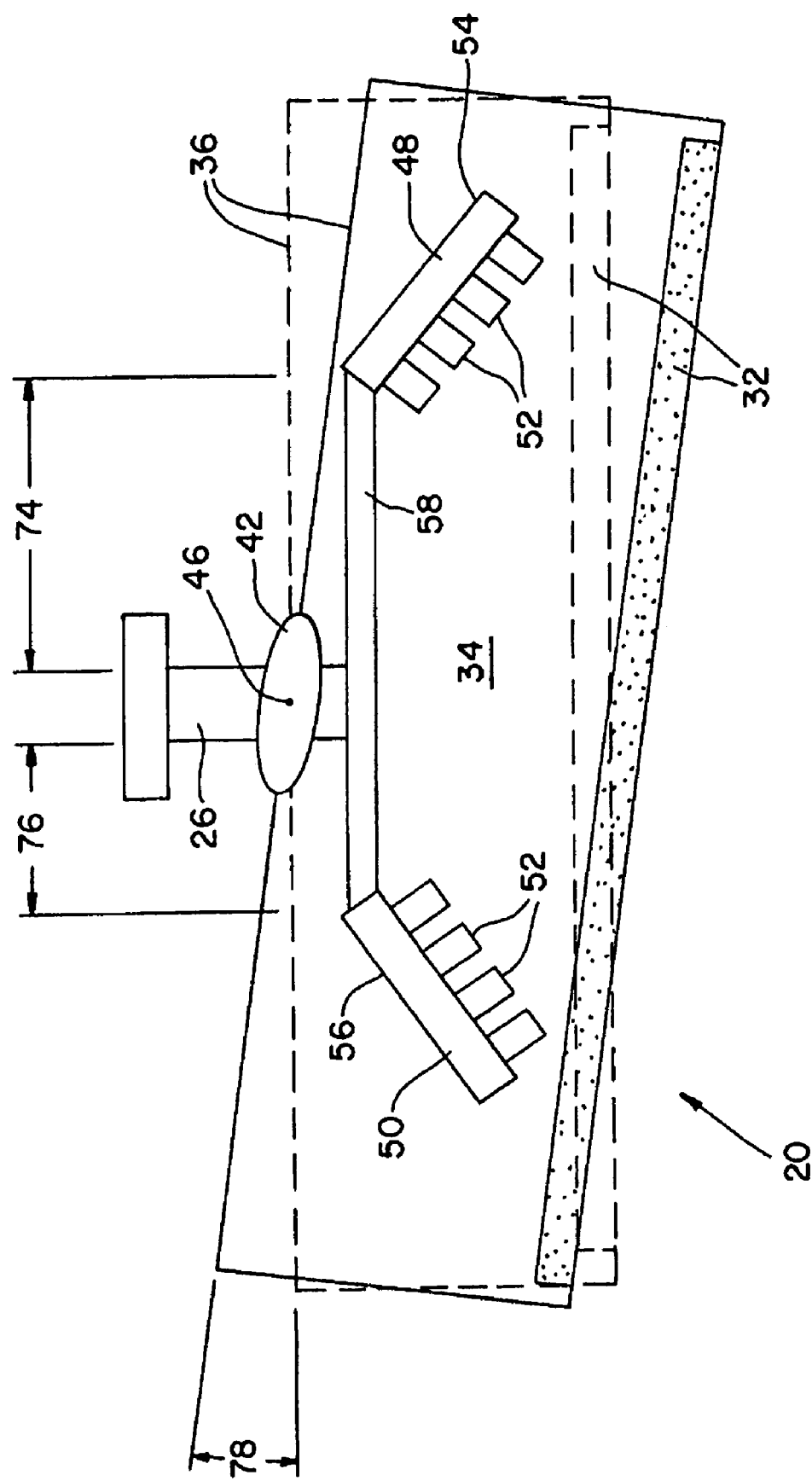
FIG. 5 is a schematic overhead view of the illumination apparatus of the occupant monitoring arrangement of FIG. 1 illustrating rotation of the shell and mirror toward the driver from the unrotated position of FIG. 4.

As shown in FIG. 5, shell 34 and mirror 32 may be manually pivoted in a horizontal plane about vertical axis 46. The manual pivoting may be performed by a driver or other passenger in order to adjust the view in the mirror, as is well known. Substrates 54, 56 and base 58 may be configured so as to accommodate such pivoting, especially pivoting of mirror 32 toward the driver. More particularly, a distance 74 between array 48 of optical elements 52 and mounting device 26 is greater than a distance 76 between array 50 of optical elements 52 and mounting device 26. Due to the shorter distance 76, mirror 32 and shell 36 may be pivoted over a larger angle 78 without risk of mirror 32 colliding with array 50. Manually pivoting shell 34 in a vertical plane about axis 44 is not liable to affect desired results. For example, shell 34 may be pivoted in a vertical plane without risk of mirror 32 colliding with either of arrays 48, 50.

Optical energy source 24 has been disclosed herein as being disposed within a frame in the form of an enclosed shell 36. However, it is also possible for the frame to be in a form other than an enclosure such that optical energy source 24 is more exposed. For example, the frame may include one or more beams interconnecting the mounting device and the perimeter that retains the mirror.

The embodiments disclosed above are not intended to be exhaustive or to limit the invention to the precise forms disclosed in the detailed description. Rather, the embodiments have been chosen and described so that others skilled in the art may utilize their teachings.

Although described in the exemplary embodiments, it will be understood that various modifications may be made to the subject matter without departing from the intended and proper scope of the invention.

The invention claimed is:

1. An optical occupant monitoring arrangement for a vehicle, said arrangement comprising:
    a mounting device configured to be attached to a fixed structure of the vehicle;
    a frame pivotally attached to said mounting device;
    a rearview mirror retained within said frame;
    an optical energy source fixedly attached to said mounting device and configured to emit optical energy through said mirror into a passenger compartment of the vehicle; and
    an optical energy receiver configured to receive the optical energy emitted by said optical energy source after the optical energy has been reflected within the passenger compartment of the vehicle.

2. The arrangement of claim 1, wherein said frame includes a cavity, said optical energy source being disposed within said cavity.

3. The arrangement of claim 1, wherein the optical energy comprises infrared light.

4. The arrangement of claim 1, wherein said optical energy source is directed toward at least one of a driver's seat, a front passenger's seat, and the passenger compartment of the vehicle.

5. The arrangement of claim 1, wherein said optical energy source includes a pre-aligned infrared light emitting diode board.

6. The arrangement of claim 1, wherein said optical energy source includes a two-dimensional array of first optical energy elements and a two-dimensional array of second optical energy elements, said first optical energy elements being directed toward a driver's seat of the vehicle, said second optical energy elements being directed toward a front passenger's seat of the vehicle.

7. The arrangement of claim 1, wherein the fixed structure comprises a windshield of the vehicle.

8. The arrangement of claim 1, wherein said optical energy source includes a first optical energy element and a second optical energy element, said first optical energy element being directed toward a driver's seat of the vehicle, said second optical energy element being directed toward a front passenger's seat of the vehicle.

9. The arrangement of claim 8, wherein a first distance between said first optical energy element and said mounting device is greater than a second distance between said second optical energy element and said mounting device.

10. The arrangement of claim 9, wherein said optical energy source includes a base interconnecting said mounting device, said first optical energy element, and said second optical energy element, a direction of said first optical energy element forming a first acute angle relative to said base, a direction of said second optical energy element forming a second acute angle relative to said base, said first acute angle being greater than said second acute angle.

11. An illumination apparatus for an optical occupant monitoring system in a vehicle, said apparatus comprising:
    a mounting device configured to be attached to a fixed structure of the vehicle;
    a shell pivotally attached to said mounting device, said shell having an internal cavity with an opening defined by a perimeter of said shell;
    a rearview mirror retained by said perimeter; and
    an optical energy source fixedly attached to said mounting device and disposed within said cavity of said shell.

12. The apparatus of claim 11, wherein said optical energy source is configured to emit optical energy through said mirror into a passenger compartment of the vehicle.

13. The arrangement of claim 11, wherein the optical energy comprises infrared light.

14. The arrangement of claim 11, wherein said optical energy source is directed toward at least one of a driver's seat and a front passenger's seat of the vehicle.

15. The arrangement of claim 11, wherein said optical energy source includes a pre-aligned infrared light emitting diode board.

16. The arrangement of claim 11, wherein said optical energy source includes a two-dimensional array of first optical energy elements and a two-dimensional array of second optical energy elements, said first optical energy elements being directed toward a driver's seat of the vehicle, said second optical energy elements being directed toward a front passenger's seat of the vehicle.

17. The arrangement of claim 11, wherein the fixed structure comprises a windshield of the vehicle.

18. The arrangement of claim 11, wherein said optical energy source includes a first optical energy element and a second optical energy element, said first optical energy element being directed toward a driver's seat of the vehicle, said second optical energy element being directed toward a front passenger's seat of the vehicle.

19. The arrangement of claim 18, wherein a first distance between said first optical energy element and said mounting device is greater than a second distance between said second optical energy element and said mounting device.

20. The arrangement of claim 19, wherein said optical energy source includes a base interconnecting said mounting device, said first optical energy element, and said second optical energy element, a direction of said first optical energy element forming a first acute angle relative to said base, a direction of said second optical energy element forming a second acute angle relative to said base, said first acute angle being greater than said second acute angle.

21. A method of monitoring an occupant of a vehicle, said method comprising:
    providing an arrangement comprising a mounting device attached to a fixed structure of a vehicle and a frame pivotally attached to the mounting device and defining a cavity, a rearview mirror retained in the frame, and an optical energy source disposed within the cavity and fixedly attached to the mounting device;
    emitting optical energy from the optical energy source through a rearview mirror of the vehicle and into a passenger compartment of the vehicle; and
    receiving the optical energy after the optical energy has been reflected within the passenger compartment of the vehicle.

22. The method of claim 21, wherein the optical energy comprises infrared light.

23. The method of claim 21, wherein the optical energy is emitted toward at least one of a driver's seat and a front passenger's seat of the vehicle.

* * * * *